Patented May 4, 1926.

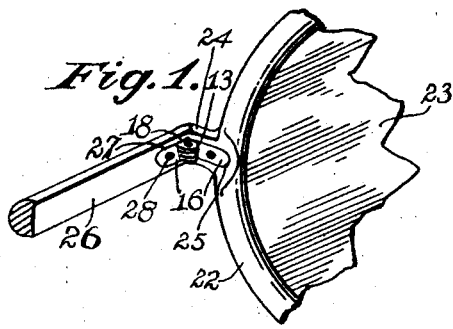

1,582,898

UNITED STATES PATENT OFFICE.

JACOB BOBROW, OF BROOKLYN, NEW YORK.

HINGE AND THE HINGEDLY CONNECTING OF TEMPLES TO FRAMES OF SPECTACLES.

Application filed July 27, 1925. Serial No. 46,300.

*To all whom it may concern:*

Be it known that I, JACOB BOBROW, a citizen of the United States, and resident of borough of Brooklyn, in the county of Kings, city and State of New York, have invented certain new and useful Improvements in Hinges and the Hingedly Connecting of Temples to Frames of Spectacles, of which the following is a specification.

This invention relates to hinges and the hingedly connecting of temples to frames of spectacles made of celluloid and the like, and it is the object of the invention to provide an improved hinge for this purpose and method of making the same, as well as to the method of mounting the hinge members upon the spectacle frame and temples whereby due to the construction and arrangement of the hinge and the mounting of the same upon the spectacle frame and temples a small and compact hinge connection is provided with the hinge practically concealed from view when the spectacles are in use.

In carrying out the construction of the hinge members I provide a strip or bar of material of which the hinge is to be made comprising a base portion with an integral rib to extend at a right angle from one face of the base adjacent a longitudinal edge. The rib is then transversely slotted to form juxtaposed knuckles after which the knuckle members are perforated for the engagement of a pintle and one knuckle threaded for the threaded engagement of the pintle when parts of the bar are severed to constitute the hinged members. After the hinged members have been severed from the bar the base portion is arranged with a portion of reduced thickness to extend laterally and around the sides thereof and the end opposite to that from which the knuckles extend. To mount the hinged members upon the spectacles, temples and frame the inner face of the temples at the butt ends as well as the inner face of parts projecting laterally through the frame are arranged with a recess of T shape in cross section and of a depth substantially the thickness of the base of the hinge members into which recess the base portion of the hinge members are engaged and secured, the temples being attached to the frame by engaging the knuckles of the hinge members attached to the frame in the spaces between the knuckles of the hinge members attached to the temples and then engaging the pintles in the registering perforations of the interengaged knuckles.

In the drawing accompanying and forming a part of this specification Figure 1 is a perspective view of a portion of a spectacle frame and temple showing the two hingedly connected by my improved hinge.

Figure 2 is an elevational view on an enlarged scale of a portion of the spectacle frame and temple connected thereto by my improved hinge, the same being partly in section to show the method of mounting the hinge members on the frame and temple.

Figures 3 and 4 are perspective views of the respective members of a hinge.

Figure 5 is a perspective view of a portion of the butt end of a temple to show the arrangement of the recess in the inner face for mounting a hinge member therein.

Figure 6 is a perspective view of a portion of a stock bar which the hinge members are made, and showing the method of transversely slotting the rib of the bar to form hinge knuckles and the manner of severing portions of the slotted bar to constitute hinge members.

Figure 7 is a cross sectional view on an enlarged scale of a portion of a temple arranged with the hinge engaging recess to show the manner of arranging a bushing therein, or in the projections of the frame, for the engagement of attachment means to secure the hinge members in position in the temples and frame.

Figure 8 is an end elevation partly in section of die mechanism and an hinge member therein to show the manner of arranging the base of the hinge with the marginal edge portion of reduced thickness; and Figure 9 is a cross sectional view of a temple taken substantially on the line 9—9 of Figure 2 looking in the direction of the arrows to show the mounting of a hinge member therein.

In the construction of the hinge members as shown in Figures 3 and 4 I provide a stock bar as shown in Figure 6 comprising a base portion 10 having a rib 11 extending at a right angle to the base along a longitudinal marginal portion the longitudinal edge of the base at the juncture of the rib therewith being beveled as shown at 12 for a purpose to be hereinafter described. The rib 11 is transversely slotted to form a series of ears 13 to constitute the knuckles of the hinge members, the space between adjacent ears being of the same width as the thickness of the ears after which the ears are perforated, as shown at 14, and when forming the hinge member shown in Figure 3 the third ear is tapped or threaded for the threaded connection of a pintle engaged in said perforations to pivotally connect the hinge members. After the one ear has been tapped a portion of the bar is severed as on the dotted line 15 to form the hinge member with three knuckles as shown in Figure 3 and the base of the bar constitute the leaf 16 of the hinge member. After the hinge member has been severed from the bar it is arranged with a perforation 17 for the engagement of securing means when mounting the hinge members upon the temples and frame of spectacles. The other hinge member shown in Figure 2 is constructed in a similar manner except that it is provided with two knuckles instead of three and said knuckles perforated only, the knuckles of said hinge member being adapted to be engaged in the spaces between the knuckles of the other hinge member and pivotally connected by a pintle engaged in the knuckle perforations, as at 18, as pintles having the end threaded for engagement with the threaded perforation of the one knuckle. The levers 16 of the hinge members so formed are then arranged with a lateral projection or flange portion 19 of rectangular shape in cross section and of less thickness than the leaf and extending longitudinally of the sides from the beveled end 12 and around the end of the leaf opposite the knuckles 13, this latter end preferably being rounded, as clearly shown in Figures 3 and 4. This extended portion of reduced thickness 19 is arranged on the leaves by spreading or causing a portion of the leaf to spread outward by die mechanism as shown in Figure 8 comprising a female die 20 of a size of the width and length of the finished hinge member with the extended flange but of less width and length than the hinge member when severed from the bar, and providing a hollow punch or male die 21 to fit into the female die and the wall thereof of a thickness with the width of the extended and reduced portion 19, such reduced portion 19 being formed by forcibly bringing down the punch member between the marginal portions of the leaf of a hinge member in the die 20. The hinge member may be positioned in the die 20 by a pin projecting up from the bottom of the die for engagement in the perforation 17.

In spectacles of the character specified, the frame 22 in which the lenses 23 are mounted are arranged with laterally and oppositely extending projections 24 upon which one of the hinge members is mounted, in the present instance the member shown in Figure 4, by arranging a recess 25 in the face to constitute the inner face of said projection, said recess extending inward from the end thereof a distance equal to the length of the leaf and of T shape in cross section to conform to the cross sectional shape of the leaf of the hinge member whereby the opposite side and end of the recess have an undercut portion of rectangular shape to conform to the shape and for the engagement of the extended and reduced leaf flange 19 as shown in Figure 9.

The other hinge member is mounted in the butt end of the temples 26 by arranging therein a recess 27 extending inward from the butt end similar to the recess in the frame projections 24 described and clearly shown in Figure 5. The recesses in the frame projections and butt ends of the temples may be conveniently formed by a hand milling tool.

After the recesses have been formed in the frame projections and temples the respective hinge members are slid endwise into the recesses the overhanging portion of the side walls of the recesses engaging over the extended and reduced flange portion 19 of the hinge members and holding the latter against lateral displacement. With the hinge members engaged in the recesses the knuckles of one hinge member are engaged in the spaces between the knuckles of the other hinge member when the pintle is inserted into the perforations in the hinge knuckles thereby hingedly connecting the temples to the frame.

The butt ends of the temples and of the frame projections 24 are beveled at an angle of forty-five degrees the same as the beveled portion 12 of the hinge members whereby as the temples are swung outward from the frame said movement is limited by the end of the temples abutting the end of the frame projections and the temples will extend at right angles to the frame as shown in Figures 1 and 2.

With the hinge members so mounted by applying heat and pressure on the lateral portions of the frame projections and temples and allowing the same to cool while under pressure the hinge parts will be firmly seated in the frame and temple recesses without possibility of displacement. However, to assure the hinge members from being displaced endwise from the recesses they are secured therein by screws 28 engaged in the perforations 17 and threaded into bushings 29 seated in the bottom of the recesses as clearly shown in Figure 2. These bushings 29 are made of soft metal, such as brass, and forced into openings in the bottom of the recesses in a suitable manner, as by engaging the frame projections or temple in the recess of a block 30, engaging a bushing over the reduced end 31 of a plunger 32 and applying pressure to the plunger and thereby forcing the bushing into the opening as shown in Figure 7.

Having thus described my invention what I claim is:

1. The hingedly connecting of temples to the frame of spectacles, consisting in arranging recesses of T shape in cross section in one face of the temples and extending inward from the butt end and in a face of the frame extending inward from the lateral marginal portion thereof, providing hinge members arranged with a leaf and perforated knuckles extending at a right angle to each other, the leaf having a cross sectional form to correspond with the cross sectional shape of the recesses, interengaging the knuckles of the hinge members and engaging a pintle in the perforations of the interengaged knuckles, and then connecting the temples to the frame by engaging the leaf of one hinge member in the recess in the temples and engaging the leaf of the other hinge member in the frame recess.

2. The hingedly connecting of temples to the frame of spectacles as claimed in claim 1, wherein the recesses for the engagement of the hinge members mounted on the frame are arranged in projections extending laterally from the frame, and the ends of said projections and the butt ends of the temples being arranged at an angle of forty-five degrees to limit the outward movement of the temples relative to the frame.

3. The hingedly connecting of temples to the frame of spectacles as claimed in claim 1, the provision of threaded bushings imbedded in the material of the temples and frame at the bottom of the recesses, and screws engaging in perforations in the leaf of the hinge members and having threaded connection with said bushings to secure the hinge members to the temples and frame.

Signed at Brooklyn, in the county of Kings and State of New York this 20th day of July, 1925.

JACOB BOBROW.